Sept. 11, 1962   R. JAUME   3,053,395
PLEATED-WALL TUBULAR FILTER AND METHOD OF MANUFACTURING SAME
Filed July 14, 1959   3 Sheets-Sheet 1
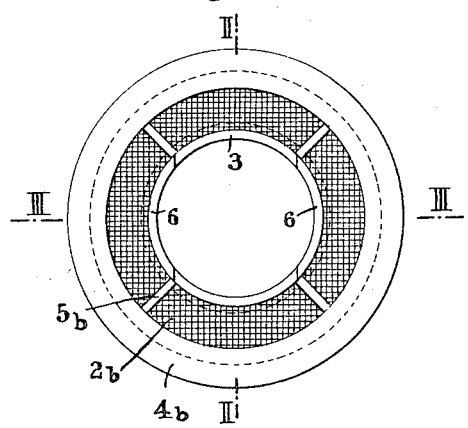
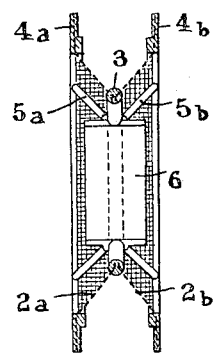
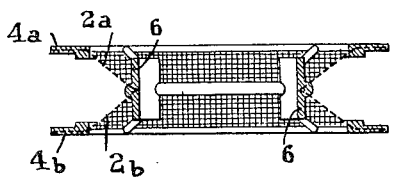
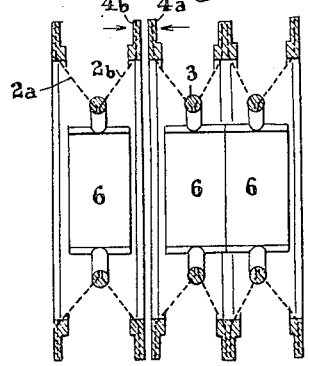
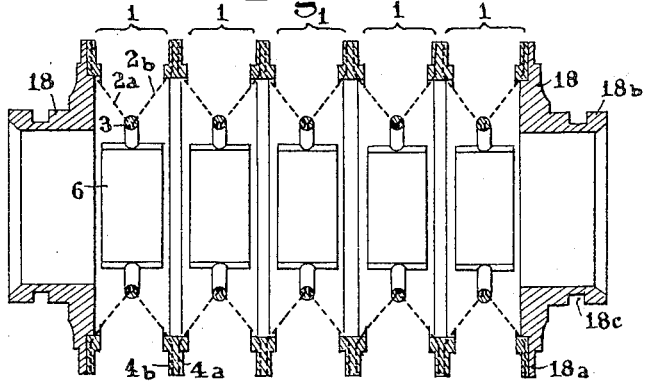

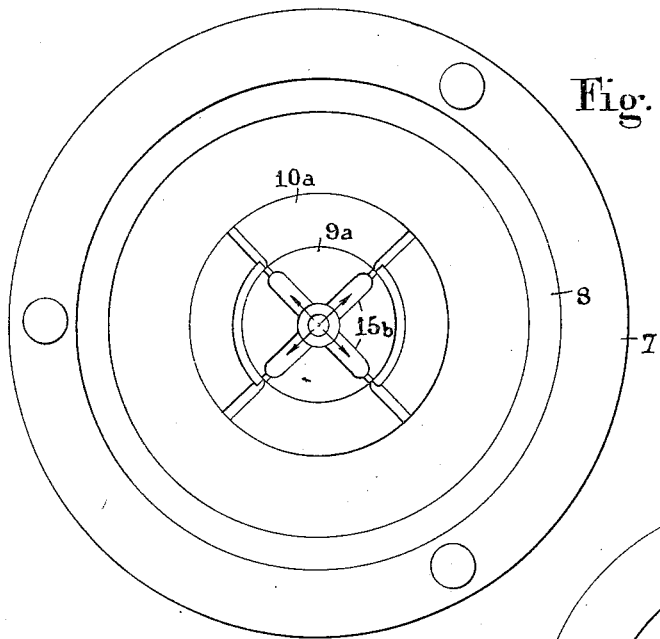
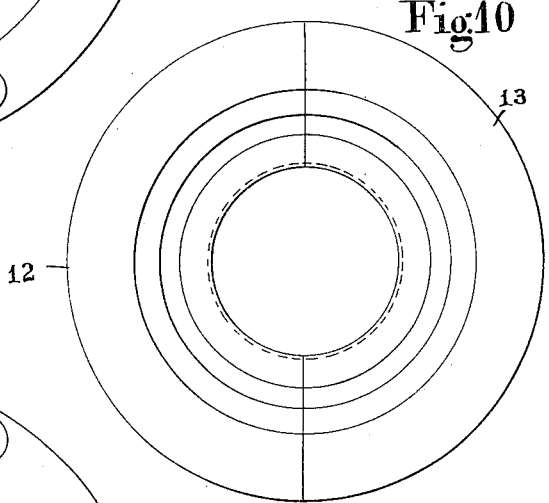
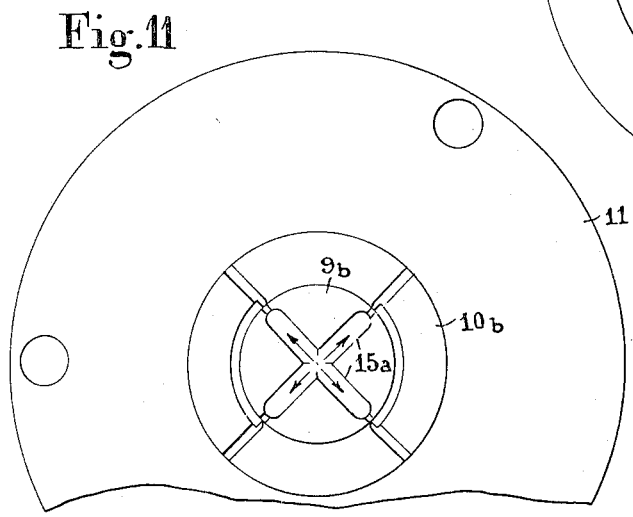

United States Patent Office 3,053,395
Patented Sept. 11, 1962

3,053,395
PLEATED-WALL TUBULAR FILTER AND METHOD
OF MANUFACTURING SAME
René Jaume, 1 Rue Erlanger, Paris France
Filed July 14, 1959, Ser. No. 826,960
Claims priority, application France July 15, 1958
3 Claims. (Cl. 210—493)

This invention relates to tubular filters of the type having a pleated wall for filtering any fluids.

It is known that certain filtration devices are formed by superposing in a case a number of washers formed with double filtering walls of slightly tapered configuration, these walls being assembled at their big diameter ends. These biconical washers contact one another at their small diameter ends. The resulting assembly has somewhat the appearance of a tubular filter having a bellows-forming pleated wall. Due to its specific configuration, this filter is characterized by a very extensive filtering area while having relatively reduced over-all dimensions which is an indisputable advantage.

However, the washer-like elements constituting these filters are not assembled in a fluid-tight manner with one another, so that the filtration is not absolutely regular. Moreover, as these washer-like elements are usually mounted on a perforated central tube, the inner space is not completely free, and in spite of its perforations the central tube interferes with the flow of fluid and consequently reduces the inner capacity of the filter, which is detrimental as far as the filtering efficiency is concerned, notably in the case of a filter for the feed circuit of an engine.

It is therefore one object of this invention to provide a pleated-wall tubular filter wherein the filtration wall is continuous and characterized by a relatively great inner capacity. It is another object of this invention to provide a method of manufacturing filters of this character which is both simple and reliable. Furthermore, it is the object of this invention to make this filter of plastic material in order to eliminate vibration and resonance effects therefrom, while imparting to this improved filter a certain flexibility in the transverse direction as well as a certain compressibility and, if desired, a certain extensibility in the axial direction.

One object of this invention is to provide a method of manufacturing a tubular filter, which consists essentially in manufacturing firstly a series of biconical filtering elements obtained by assembling the inner edges of two ring-shaped filtering walls of woven material by means of a plastic ring moulded on the edges of these walls so as to embed these edges therein, and subsequently moulding plastic collars on the outer edges of these walls. Finally, the method of this invention consists in assembling these biconical elements in series by joining the outer collars of the successive elements for example by welding.

It is another object of this invention to provide a mould for imparting a conical configuration to the two annular walls of each filter element and enabling the intermediate junction ring and the end collar to be moulded on the edges of said walls, together with any other reinforcing or like members as the case may be.

It is another object of this invention to provide a pleated-wall tubular filter and manufactured according to the method broadly set forth hereinabove, this filter consisting essentially of a series of biconical elements assembled in series, each element consisting in turn of two filtering walls of woven material having substantially the shape of opposite frusto-conical member assembled by their small ends by means of a ring of moulded plastic in which the edges of these walls are embedded, the opposite larger edges being provided with a collar also of moulded material, the different elements being assembled with one another by fastening these collars together.

This invention is also concerned with any device or apparatus for filtering fluids which is provided with filters of the type broadly set forth hereinabove.

In order to afford a clearer understanding of this invention and of the manner in which the same may be carried out in the practice, reference will now be made to the accompanying drawings forming part of this specification and illustrating diagrammatically by way of example a few typical forms of embodiment of the invention. In the drawings:

FIGURE 1 is a front elevational view showing one of the component elements of the filter;

FIGURES 2 and 3 are sections taken upon the lines II—II and III—III of FIG. 1, respectively;

FIGURE 4 is a diagrammatic axial section showing one portion of a filter constructed according to the teachings of this invention;

FIGURE 5 is an axial section illustrating a complete filter according to this invention;

FIGURES 9 to 11 are plan views illustrating the three essential components of this mould.

Figure 6:
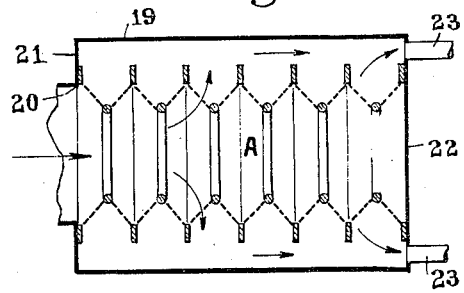
FIGURES 6 and 7 are diagrammatic axial sections showing, respectively, two different arrangements of filtration devices incorporating this filter element.

The pleated-wall tubular filter illustrated in FIG. 5 of the drawings consists of a series of identical elements 1 of substantially biconical configurations which are assembled in series, the filter illustrated comprising five such elements.

Each element 1 consists of two opposed frusto-conical filtering walls 2a, 2b of woven material which are assembled at their small ends by means of a moulded plastic ring 3. The outer edges of these walls which correspond to the big ends of the frusto-conical elements, are provided with moulded collars 4a, 4b (see FIG. 3) also of plastic material. The two filtering walls are provided with reinforcing arms or spokes 5a, 5b extending radially from the inner ring 3 and the outer collars 4a, 4b. On the other hand the collar 3 may be formed with extensions projecting on either side thereof, such as a pair of part-cylindrical extensions 6 for a purpose to be set forth presently.

These different plastic members are integral with one another and therefore moulded as a unit, with the filtering walls 2a, 2b embedded therein according to the method of manufacture constituting another object of this invention, the material of ring 3, reinforcements 5a, 5b and collars 4a, 4b covering and retaining the corresponding zones of the woven filtering walls.

According to this method, the two walls 2a, 2b are formed by cutting or otherwise shaping a pair of rings of woven filtering material which are subsequently placed into a suitable mould for imparting the desired shape thereto and causing their marginal portions to be embedded in the plastic components. The woven filtering material utilized to this end may consist of any suitable material, for example plastic yarns such as polyamid resin.

The mould utilized for manufacturing these elements comprises a first member 7 having a cavity 8 formed therein and provided with a central frusto-conical projection 9a having a tapered face 10a. The other member 11 of this mould is adapted to fit with its edges on the edges of the first member 7. This other member 11 is also formed with a central frusto-conical projection 9b having a tapered face 10b, as shown, this projection 9b fitting exactly on the other projection 9a of the first member 7. Finally, the mould comprises a third, ring-shaped member consisting of two identical pieces 12 and 13 adapted to be disassembled. This third member is adapted to fit in the free annular space formed between the members 7 and 11 around their central projections, the inner faces of members 12 and 13 being also conical and facing the faces 10a and 10b of projections 9a and 9b.

The member 7 is formed with an injection duct 14 and distributing branch channels 15a, identical channels 15b being provided in the other member 11. These members 7, 11 and the annular member 12, 13 are also formed with grooves and cavities for properly moulding the desired plastic elements.

To manufacture an element 1 a filter wall 2a cut from filtering woven material in the form of an annular blank is firstly laid upon the tapered edge 10a of projection 9a of the mould member 7. Then the two components 12 and 13 of the ring-shaped member are placed in position. On the upper inner tapered face of this ring-shaped member the second blank for forming the filter wall 2b is positioned in turn, and finally the element 11 is disposed thereupon. Thus, the two annular filter walls are shaped to constitute two opposite tapered or frusto-conical pieces. Then the inner edges of the two walls are maintained in an annular space 16 corresponding to the central ring 3 to be moulded thereon, and the outer edges are maintained in another annular space 17a, 17b corresponding to the final collars 4a and 4b.

By injecting plastic material into the duct 14, the different plastic portions of the filter element, such as the central ring 3, reinforcing members 5a, 5b, collars 4a, 4b, extensions 6 of ring 3, are moulded on the wall elements 2a and 2b.

Thus, the inner edges of walls 2a and 2b are embedded in the material of ring 3 which flows through the interstices of the woven material of these walls which are thus assembled in a very rigid and fluid-tight manner by the ring 3. Similarly, the material of collars 4a, 4b has embedded therein the outer edges of the filter walls.

Consequently, the filter walls of woven material are properly fastened to the plastic members moulded thereon. If the woven filter wall is made of the same plastic material as that utilized for moulding the rigid plastic members thereon, the filter wall material will merge with the material of these members and each element 1 will constitute a perfectly homogeneous unit.

The next step of the method of manufacturing filters according to this invention consists in assembling the filter elements 1 in series by means of their outer collars 4a and 4b shaped to this end. This assembling step is effected by pressing for example the collar 4a of an element 1 against the collar 4b of another element 1 (see FIG. 4) and subsequently welding these collars together, for example by the application of heat or high frequency current by means of adequately shaped electrodes. Thus, the desired number of elements 1 are assembled according to the length and/or function of the tubular filter unit contemplated. Finally, two special members 18 forming the joint for mounting the filter are welded on the end collars of the tubular filter assembly. These end pieces are also made of moulded plastic material and formed with an outer collar 18a, and a cylindrical portion or body 18b on which an outer peripheral groove 18c is formed. The collars 18a of these end pieces are secured, for example by welding on the collar 4a or 4b of the corresponding end element 1 of the filter.

The filter unit thus obtained is characterized by a number of substantial advantages. The essential ones being summarized hereafter:

(I) Its filtering wall, the surface of which is very considerable due to its pleated structure forms a single piece without any break of continuity, the junction between the different elements and those between the two filter walls of each element being perfectly fluid-tight. Consequently, the filtration is very regular and uniform.

(II) As this filter consists of a single unit, not of the juxtaposition of separate elements, the handling and assembling steps are greatly facilitated inasmuch as this filter is already provided with the pieces necessary for its mounting (i.e. end pieces 18).

(III) For the same reason the filter does not comprise any mounting tube or support likely to interfere with the free flow of filtered fluid and to reduce the inner capacity of the filter. Consequently, this capacity is maximum, and this constitutes an essential advantage.

(IV) If the filtering walls are made of woven plastic or resin threads, the filter will consist entirely of plastic material, thus reducing vibration as well as resonance effects.

(V) Due to its shape and to its plastic construction, this filter is characterized by a certain flexibility in the transverse direction. Thus if this filter is subjected to a certain amount of vibration, as frequently observed in filter mountings, notably in the case of filters for protecting the feed circuits of vehicle engines, its walls will also be shaken by vibration, thus preventing them from becoming prematurely clogged by the impurities retained therein. Moreover, if the filter has to be cleaned, this operation may be effected very rapidly by simply shaking this filter.

(VI) For the same reasons as those set forth hereinabove, this filter is compressible and if required very slightly extensible in the axial direction, a compression causing a more accentuated folding of the filtering walls 2a, 2b, whereas an extension produces a separation of these walls. Thus the filter can be cleaned very rapidly and easily of its impurities by successively compressing and extending it after having disassembled same from its mounting. Besides, due to the possibility of compressing and extending the filter according to this invention, this filter is capable of withstanding without any inconvenience accidental overpressures and even damping them at least partially.

(VII) This filter is free of any movable member likely to be the cause of a faulty operation, such as springs, valves, etc.

(VIII) Its weight is considerably smaller than that of conventional filters.

(IX) Its cost is also lower than that of conventional filters, due to its specific structure and mode of manufacture.

The filter according to this invention may be mounted in any desired filtration device. Thus, it may be mounted in a device comprising a case 19, (FIGS. 6 and 7) its end pieces 18 being secured on the end walls of this case which are formed to this end with a cylindrical inner neck adapted to co-act with the cylindrical portion 18b of these end pieces.

Thus, in the example illustrated in FIG. 6, one end of a filter A according to this invention may be mounted on the edges of the central aperture 20 of an end wall 21, the other end being mounted on the end wall 22 which is formed only with exhaust or outlet pipes or unions 23 substituted for the central aperture of the other end. The fluid to be filtered is fed to the device through the inlet aperture 20 and flows through the filtering walls of the filter elements until it is discharged through the exhaust or outlet pipes 23. Of course, if desired the fluid may be caused to circulate in the opposite direction. Albeit this filter has its two ends secured on the case 19, it remains flexible in the transverse direction and its walls may be subjected to vibration to prevent them from becoming clogged.

Figure 7:
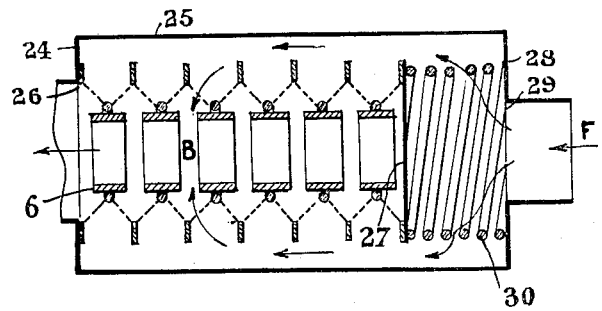
Figure 8:
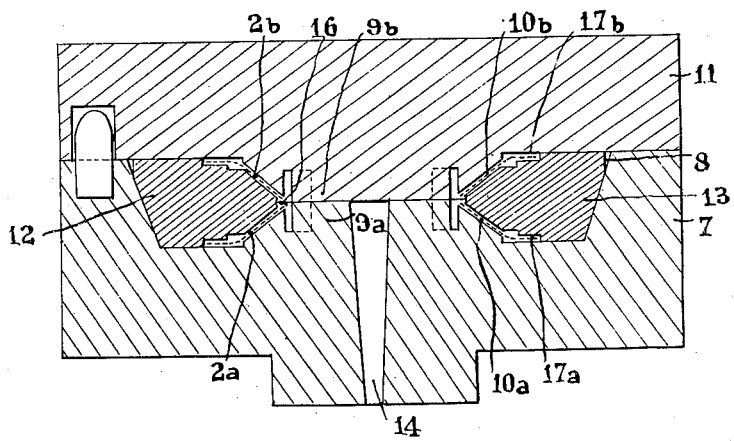
FIGURE 8 is a vertical section of a mould for manufacturing each component element of the filter.

In the example illustrated in FIG. 7, only one end of a filter B according to this invention is secured on an end wall 24 of a case 25 in the region corresponding to the edge of the central aperture 26 of this wall. The other end of the filter is entirely free or unsupported, but it is closed by a solid wall element 27 of plastic material moulded integrally with an end piece similar to the pieces 18 and secured in the same manner on the corresponding collar of the last inner element 1. The wall 28 of the relevant case end is formed in this case with a central aperture 29 to permit the passage of fluid, this aperture consistituting the inlet aperture and the aperture 26 the outlet port in case the fluid is circulated in the direction of the arrows.

It may be pointed out that due to the overhanging fixation of the filter B by only one of its ends, this filter is very free and may be subjected to considerable vibratory movements due to its great transverse flexibility. Moreover, this filter may be subjected to tensile stress and more particularly to compressive stress in the axial direction. Thus, in case of overpressure exerted in the direction of the arrow F this filter may be compressed to the extent of having its elements 1 somewhat flattened. This movement will somewhat damp out the effect of overpressure. In case of compressive stress the filter-folding movement may attain important values, the elements 1 being flattened on one another. However, it may be pointed out that this folding movement is limited by the extensions 6 of the central rings 3 of the different elements 1 constituting the filter, these extensions engaging one another. Of course, the permissible clearance may be more or less important. If desired, the extensions 6 may be eliminated completely so that the filter may fold up completely.

Assuming that the fluid circulation takes place in the opposite direction, in which case the aperture 26 is the inlet aperture, any overpressure will produce a slight elongation of the filter. However, due to the very structure of the filter, this movement can only be of moderate amplitude. Nevertheless, in order to afford a greater expansion of the filter walls in case of overpressure, the filter may be mounted in a case not freely as in the preceding examples but in a slightly compressed or pre-stressed condition, a spring 30 being interposed to this end between the wall 28 and the corresponding end of the filter.

Of course, if desired the filter may be so made as to be completely rigid, by either having the members such as ring 3, reinforcements 5a, 5b and collars 4a, 4b made of rigid plastic moulded material, or providing separate rigid members thereinstead, according to the applications contemplated. Besides, it will be readily understood by anybody conversant with the art that any desired and useful modifications may be brought to the filter of this invention, as to its shape and details, according to the specific cases and applications contemplated. Thus, this filter may comprise any suitable additional members as may be required for the mounting and operation of this filtration device, these additional members being moulded integrally with the other separate plastic members. On the other hand, the mould provided by this invention for manufacturing these filter elements may also receive any desired modifications, notably with a view to perform automatic moulding operations.

The method of manufacturing filter elements according to this invention may also be modified to suit various requirements. Thus, the collars of successive filtering elements may also be made by covering these collars with a hollow ring of plastic material moulded thereon in a suitable mould. In this case, a better adherence may be obtained by forming in these collars a plurality of holes permitting the passage of the moulded material of the junction ring therein. For the same purpose, the width of the collars may be reduced to allow the outer edge of the filtering walls 2a, 2b to project therefrom, so that the material of the junction ring may flow through the interstices of the woven material of these walls. Also for the purpose of improving the adherence between the parts, the junction ring thus moulded on the collars 4a, 4b may be made of the same plastic material as these collars so that both materials will fuse together.

What I claim is:

1. A filter arrangement comprising, in combination, an elongated housing having a pair of end walls; an elongated accordion-type tubular filter compressible and expandable in longitudinal direction and comprising a plurality of filter units each including a pair of tubular flexible filter elements of frusto-conical configuration abutting with the small diameter ends against each other and united at said small diameter ends by a substantially rigid ring integral with said filter elements, said plurality of filter units being aligned with each other in axial direction with the opposite large diameter ends of each unit spaced from each other and abutting respectively against large diameter ends of units adjacent thereto, spacer means in each unit extending in axial direction thereof and to opposite sides from and fixed to said ring uniting the small diameter ends of the filter elements of each unit, said spacer means having a total length shorter than the unit in expanded condition, and connecting means for mechanically and fluid-tightly connecting abutting large diameter ends of adjacent units to each other, said connecting means being in the form of substantially rigid end rings integral with the large diameter ends of adjacent units and extending only outwardly of the frusto-conical filter elements thereof so as not to impede flow of liquid in longitudinal direction through said elongated tubular filter, the end ring of one unit at one end of said elongated filter being connected to one end wall of said elongated housing for closing said elongated filter at said one end and the end ring of the unit at the other end of said elongated filter being spaced from the other end wall of said housing; a closure plate fastened to the last mentioned end ring for closing said elongated filter at said other end; spring means operatively connected to said closure plate and tending to move the latter away from said other end wall; fluid inlet means communicating with the interior of said tubular filter for feeding fluid into the interior of said tubular filter; and fluid outlet means communicating with the space between the exterior of said elongated filter and the interior of said elongated housing for feeding fluid out of said housing.

2. A filter arrangement as defined in claim 1 in which all components of said filter units are made from plastic material and in which said ring and said spacer means of each unit are integrally moulded.

3. A filter arrangement comprising, in combination, an elongated housing having a pair of end walls; an elongated accordion-type filter compressible and expandible in longitudinal direction and comprising a plurality of filter units each including a pair of tubular flexible filter elements of frusto-conical configuration abutting with the small diameter ends against each other and united at said small diameter ends, said plurality of filter units being aligned with each other in axial direction with opposite large diameter ends of each unit spaced from each other and abutting respectively against large diameter ends of units adjacent thereto, rigid spacer means in each unit and extending in axial direction from and being fixed to the connected small diameter ends of the filter elements of each unit, said spacer means having a total length shorter than that of the unit in expanded condition, and connecting means for mechanically and fluid-tightly connecting abutting large diameter ends of adjacent units to each other, said connecting means extending only outwardly of the frusto-conical filter elements so as not to impede flow of liquid in longitudinal direction through said elongated tubular filter, the free end of one unit at one end of said elongated filter being connected to one end wall of said elongated housing and the free end of the unit at the other end of said elongated filter being spaced from the other end wall of said housing; closure means fastened to said last mentioned free end for closing said elongated filter at said other end; spring means operatively connected to said closure means and tending to move the latter away from said other end wall; first passage means communicating with the space in the interior of said tubular filter; and second passage means communicating with the space between the exterior of said filter and the interior of said elongated housing, said first and second passage means respectively serving for feeding fluid into and out of said spaces.

References Cited in the file of this patent

UNITED STATES PATENTS

| | | |
|---|---|---|
| 1,601,029 | Ligonnet | Sept. 28, 1926 |
| 1,910,553 | Lentz | May 23, 1933 |
| 2,330,625 | Reppmann | Sept. 20, 1943 |
| 2,444,147 | Walton | June 29, 1948 |
| 2,732,031 | Rabbitt | Jan. 24, 1956 |
| 2,788,901 | Boeddinghaus | Apr. 16, 1957 |

FOREIGN PATENTS

| | | |
|---|---|---|
| 722,472 | Great Britain | Jan. 26, 1955 |
| 803,101 | France | June 29, 1936 |